United States Patent [19]

Diaz

[11] Patent Number: 5,107,756
[45] Date of Patent: Apr. 28, 1992

[54] SPRAY BOOTH WITH ALTERNATIVE FILTERING SYSTEMS

[75] Inventor: William Diaz, Chicago, Ill.

[73] Assignee: Reclaim, Elk Grove Village, Ill.

[21] Appl. No.: 640,491

[22] Filed: Jan. 11, 1991

[51] Int. Cl.⁵ .................................... B05C 15/00
[52] U.S. Cl. ........................ 454/53; 118/326
[58] Field of Search ............... 98/115.2; 118/326

[56] References Cited

U.S. PATENT DOCUMENTS

| | | | |
|---|---|---|---|
| 4,378,728 | 4/1983 | Berkmann | 98/115.2 |
| 4,562,791 | 1/1986 | Porter | 98/115.2 X |
| 4,590,884 | 5/1986 | Kreeger et al. | 98/115.2 X |

*Primary Examiner*—Harold Joyce
*Attorney, Agent, or Firm*—Fitch, Even, Tabin & Flannery

[57] ABSTRACT

An electrostatic paint powder booth apparatus having filters for recovery of overspray powder entrained in the air drawn from the housing in which workpieces are sprayed. The apparatus comprises interchangeable particulate filter systems in combination with alternative airflow paths, allowing for rapid changeover between successive runs of differing colors without intermixing of the different colors.

25 Claims, 4 Drawing Sheets

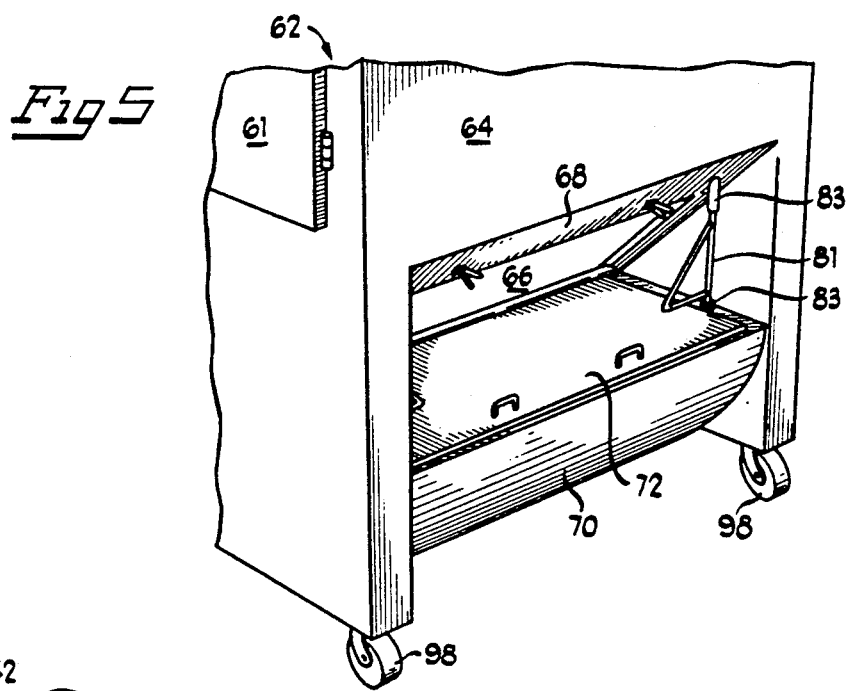
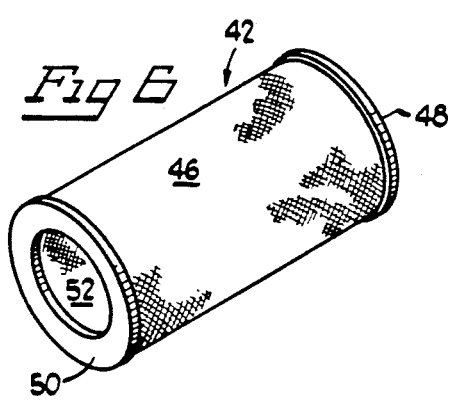
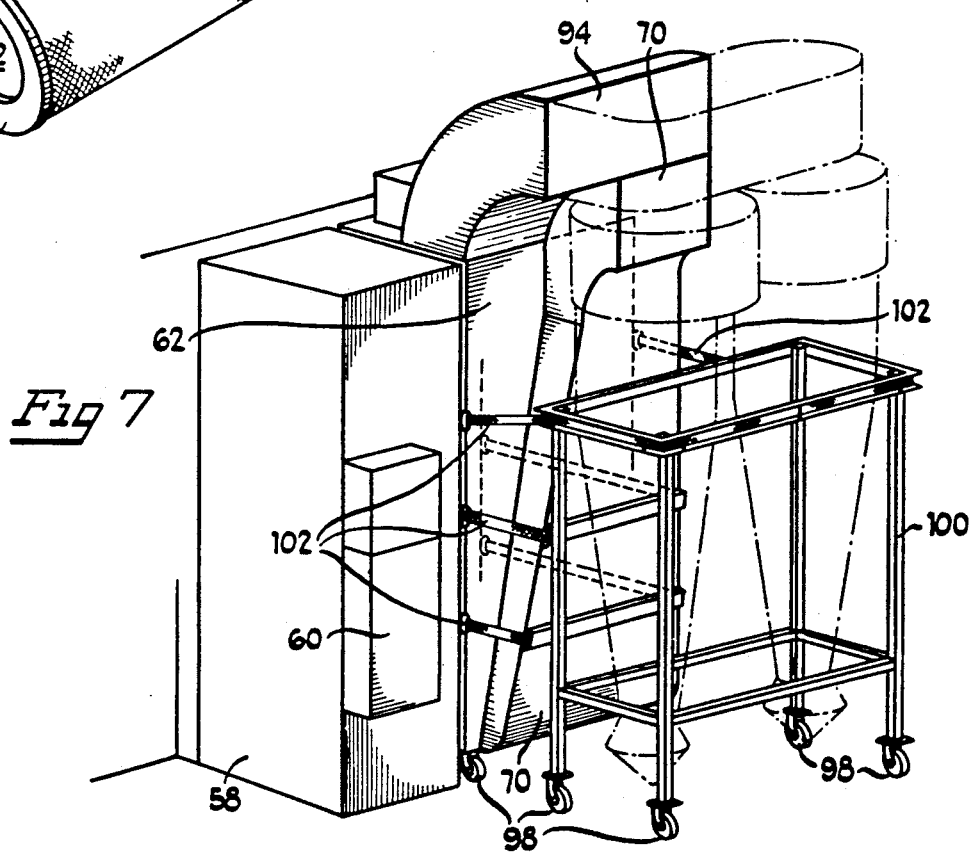

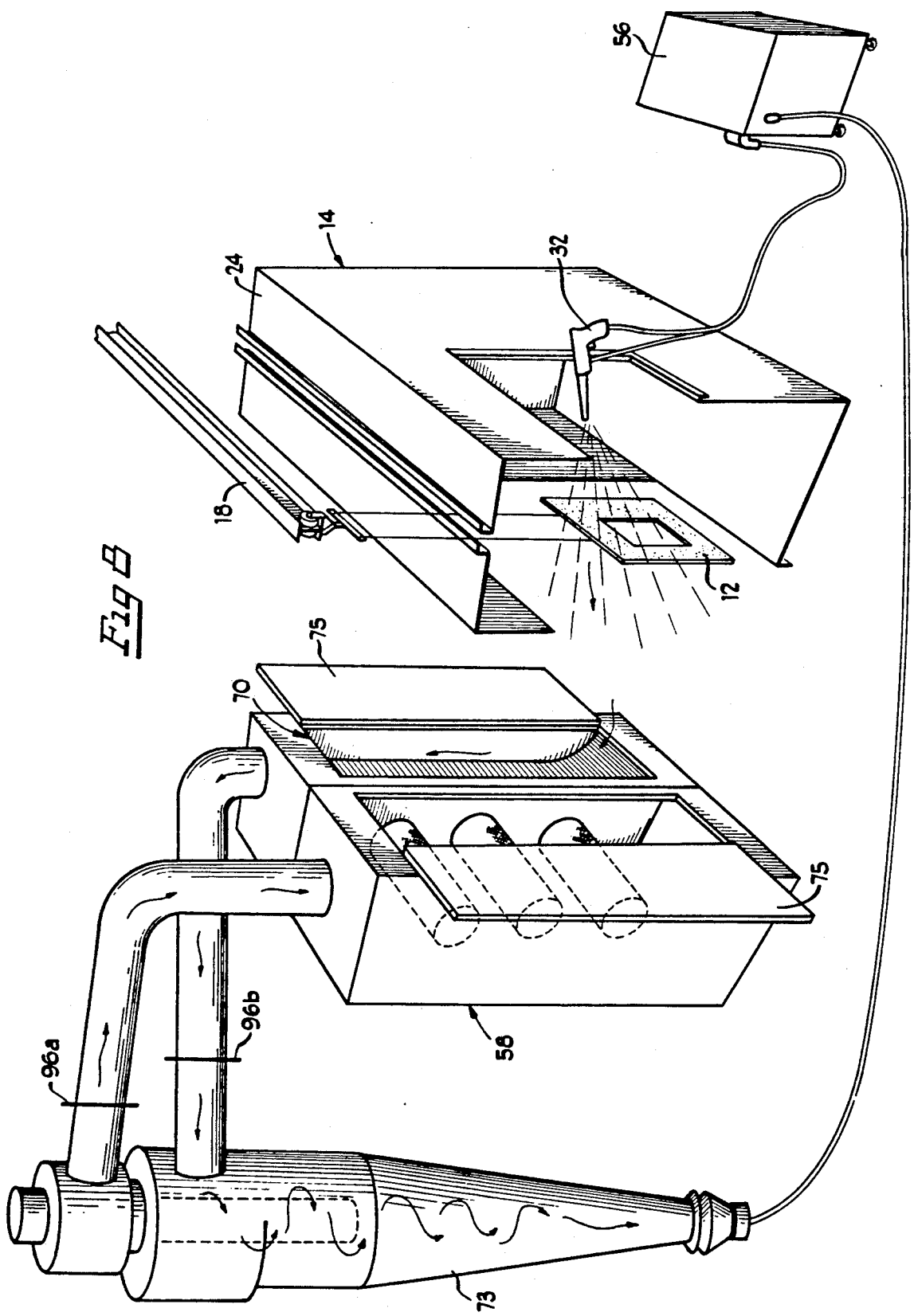

SPRAY BOOTH WITH ALTERNATIVE FILTERING SYSTEMS

FIELD OF THE INVENTION

This invention relates to recovery of sprayed powder entrained in air and, more particularly, to recovery of overspray paint powder from an electrostatic paint booth.

BACKGROUND OF THE INVENTION

An electrostatic paint system consists of a paint booth or enclosure in which a coating such as paint powder is applied to parts, a conveyor for carrying parts into and out of the booth, and an electrostatic paint applying system. The paint applying system includes a powder spraying device which imparts a velocity to the paint powder particles which directs them toward the device to be painted, places and electrical charge on the powder particles, creates an electrical field between the device being painted and ground, and meters the powder. Electrostatically-charged powder particles are attracted to and have an affinity for the grounded object to be painted since the grounded object assumes a polarity opposite that of the powder-spraying device. The charged powder particle, acted upon by the electrical field, can be deflected from its original trajectory in the direction of the grounded object.

In an automatic electrostatic system, the spraying device may be mounted in a fixed position, attached to a gun mover device that provides reciprocating motion, attached to a robot that imparts a predetermined complex motion, or manipulated manually. An electrostatic adhesion system greatly increases powder transfer efficiency from the gun to the surface to be coated as compared to a non-electrostatic device.

The paint powder that does not adhere to the part is generally referred to as overspray. Overspray consists of powder that misses the part, rebounds from the part surface, and powder electrostatically deflected to other grounded surfaces such as spray booth metal components and article conveyors. Most overspray is entrained in the spray booth exhaust air. This invention relates to an improved means for recovery of overspray entrained in spray booth exhaust air, particularly wherein varying colors are employed in successive runs.

Electrostatic powder spray users generally use either a cyclone type powder recovery system or a cartridge filter type powder recovery system.

Cartridge systems are very efficient, recovering nearly all powder overspray for reuse. However, the shortcoming of cartridge systems is that separate cartridge cabinets are required for each color to be run wherein separate cartridge cabinets, each dedicated to the recovery of only one particular color, are employed. That is, it is very difficult and time-consuming to completely clean the cartridge cabinets. Thus, dedicated cartridge cabinets are interchanged wherein a cabinet dedicated to a given color is installed when running that color, and replaced with another cabinet dedicated to the particular color to be run next. A primary concern in changing between successive colors is the prevention of intermixing of colors between successive runs. Even a small quantity of one color contaminating a second different color will result in an undesirable speckling effect. This intermixing prevention is the reason for utilization of independent cartridge booths for each separate color. The cost of maintaining such multiple cartridge booths for each separate color denies many users the ability to utilize a large number of colors, and also prohibits such users from limited runs of infrequently-used or custom colors.

In comparison, conventional cyclones alone normally recover only approximately 80% to 90% of oversprayed powder. A scrap collector is employed to trap the remainder of the powder. Powder from the scrap collector is speckled and must therefore, be disposed of. Thus, cyclones are not as efficient as cartridges. In long runs, this difference in efficiency can result in a substantial difference in powder usage and, accordingly, cost of operation. However, cyclones are advantageous in that, unlike cartridges, cyclones can be completely cleaned between successive runs of differing colors in a relatively short time. Thus, since one cyclone can be easily cleaned after a color run, it is not necessary to employ separate cyclones for each color to be run. Accordingly, short runs of specialized colors can be performed much more economically than with cartridge systems, which require separate cartridges for each specialized color to be run.

Currently users have to choose between either cartridge systems or cyclone systems. It is desirable to provide a single powder recovery system which provides both the nearly complete powder recovery attainable from cartridge systems and the color flexibility attainable from cyclone systems. It is also desirable to provide such an apparatus wherein separate cartridge cabinets and cyclone modules can be interchanged as desired to suit the needs of any particular user.

SUMMARY OF THE INVENTION

In accordance with the present invention, an electrostatic, adhesion powder spray paint apparatus is provided which provides heretofore unattainable flexibility in allowing users to take advantage of the benefits of both cyclone and cartridge systems. The present invention is a modular type apparatus wherein both cyclones and cartridge cabinets are employed which are removable and interchangeable to suit the specific needs of the user.

In running high volume or commonly used colors, the cyclone module is isolated from the spray booth apparatus, and the overspray from the spray booth is drawn directly into a conventional cartridge cabinet in a conventional manner. That is, the overspray powder-air mixture is drawn into a conventional, dedicated cartridge cabinet and drawn radially through the cartridge filters in the cartridge cabinet which separate the powder from the air. Overspray powder accumulated on the exterior of the cartridge filters is pulsed off the filters by short pulses of reverse flowing air, into a hopper located at the bottom of the cartridge module where the powder mixes with the replenished virgin powder and is pumped back to the spray guns. As stated above, since the cartridge cabinet is dedicated to that particular color, the recovered powder pulsed off the filters is untainted by other colors and therefore reusable. Such an arrangement allows recycling of virtually all overspray.

In changing to a secondary color, the air path from the spray booth is diverted such that overspray powder is drawn from the spray booth directly into the cyclone, initially bypassing the cartridge module. The centrifugal force within the cyclone throws the particulate against the cyclone wall which separates the majority of the powder from the air-powder mixture. The fine particulate not separated in the cyclone is drawn out of the cyclone through its upper end into a scrap collector, which may be either a conventional bag house or a cartridge booth dedicated to collection of scrap.

One embodiment of the present invention provides an arrangement whereby the cartridge cabinet module serves a dual function. In addition to the interchangeable, dedicated cartridge cabinets inserted for each individual commonly-used color, which serve as efficient power recovery means when the diverter door is in its first position, a scrap collecting cartridge cabinet is inserted when secondary colors are run through the cyclone. This scrap cartridge cabinet is dedicated to recovery of the fine particulate not separated by the cyclone which exits from the top of the cyclone. Such dual usage provides reduced apparatus cost and plant floor space requirements.

In accordance with one embodiment of the present invention, an arrangement is provided wherein pivoting of a single flapper or diverter door between first and second positions provides the desired redirection of air flow. That is, when the diverter door is pivoted to a first position, the overspray air-powder mixture from the spray booth is drawn directly into a dedicated cartridge booth adjacent the spray booth, with the cyclone isolated from the system. Isolation of the cyclone permits the cyclone module to be completely removed from the remainder of the apparatus while the secondary colors are run in the cartridge mode Accordingly, great time savings are realized by the ability to clean the cyclone module while another color is being run through the cartridge cabinet.

When the diverter door is pivoted to a second position, the airpath leading directly into the cartridge cabinet is blocked and the overspray air-powder mixture from the spray booth is drawn instead directly into the cyclone.

In one embodiment, sliding of a single safety panel between open and closed positions allows the exit from the cyclone to alternately communicate with the cartridge cabinet and be isolated from the cartridge cabinet. The safety panel is slid to its closed position when running primary colors in the cartridge collection mode so as to prevent migration of particulate pulsed from the cartridge filters into the cyclone, thereby contaminating the cyclone.

With the safety panel in its open position, and the diverter flap in its second position, overspray powder is drawn first into the cyclone with the fine particulate not separated by the cyclone exiting the top of the cyclone and drawn into the scrap cartridge cabinet. With the safety panel in its closed position, and the diverter door pivoted to its primary position, overspray powder is drawn directly into the cartridge cabinet with the cyclone completely isolated from the remainder of the apparatus, and whereby the cyclone can therefore be removed for cleaning or the like or left in place without concern for particles therein contaminating or being contaminated by differing colors in the cartridge cabinet.

Further advantages over current designs are also provided by powder recovery apparatus constructed in accordance with the present invention. One particular advantage provided by the flexibility of the present invention is the ability to rapidly switch to running of a color which is disposable without the need to clean any ductwork. This is accomplished by inserting a cartridge cabinet dedicated to scrap recovery and placing the diverter door in its first position, whereby the air-powder mixture from the spray booth is drawn into the scrap cartridge cabinet wherein the powder is separated by the cartridge filters and scrapped. This alternative may be particularly desirable in applications wherein a very limited run of a color is to be performed. Another advantage over prior designs is the minimal ductwork required to be cleaned between successive runs. Additionally, the removability of the cyclone module from the remainder of the apparatus provides greater access for cleaning than conventional, fixed mounted cyclones. When the cyclone is removed, it has no ductwork attached thereto, thus allowing the user to clean directly into the inlet and outlet scrolls.

Further advantages will become apparent as the description proceeds and the features of novelty which characterize this invention will be pointed out with particularity in the claims annexed to and forming a part of the specification.

BRIEF DESCRIPTION OF THE DRAWINGS

In the drawings, wherein like elements are reference alike,

FIG. 5 is a fragmentary, perspective view of a diverter door portion of the spray booth apparatus shown in FIG. 1;

FIG. 6 is a perspective view of a cartridge filter employed in the cartridge cabinet portion of the spray booth apparatus shown in FIG. 1;

FIG. 7 is a perspective view of the spray booth apparatus shown in FIG. 1 illustrating the arrangement and attachment of the interchangeable cyclone and cartridge modules.

FIG. 8 is a perspective view of an alternate embodiment of the invention.

DETAILED DESCRIPTION OF THE PREFERRED EMBODIMENT

Figure 1:
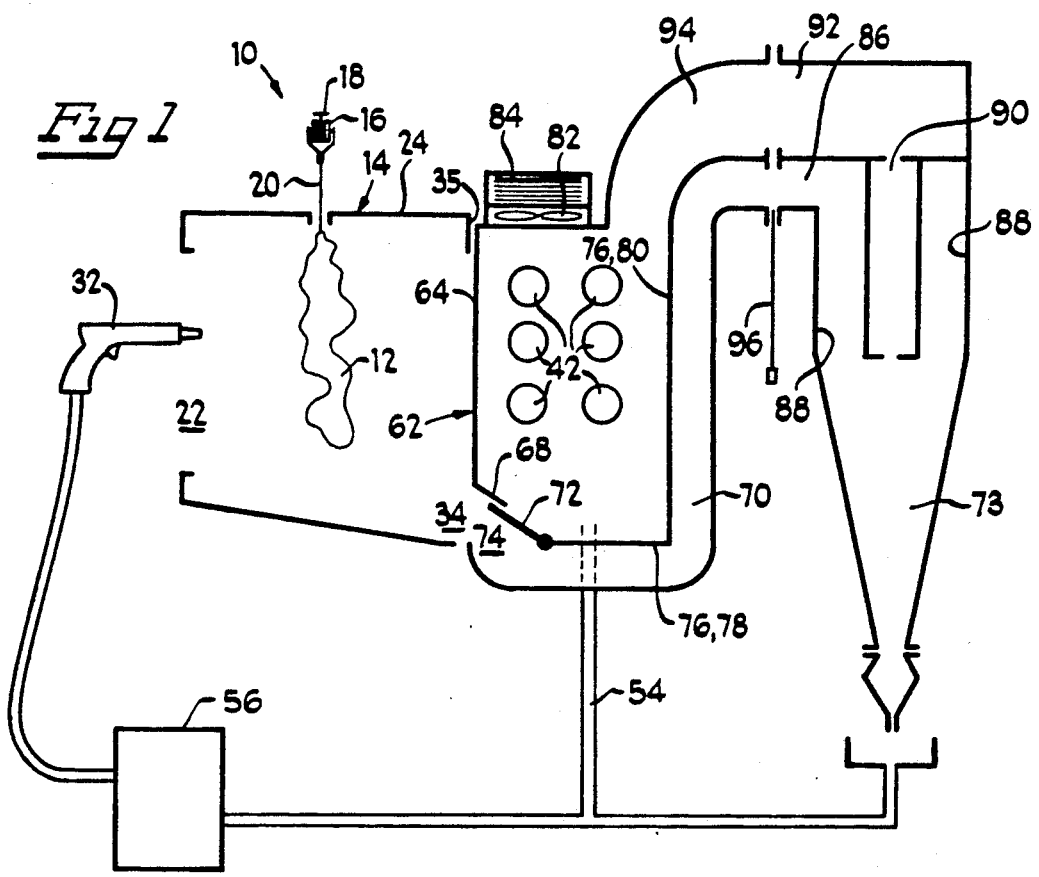
FIG. 1 is a schematic view of a spray booth apparatus embodying the present invention.

As shown in the drawings for purposes of illustration, the invention is embodied in an electrostatic, adhesion powder spray booth. Referring initially to FIG. 1, the spray booth apparatus indicated generally at 10 is illustrated to show one arrangement of apparatus for carrying out the present invention. While the apparatus is described herein in connection with a powder spray painting operation, the usefulness of the apparatus of the invention is not limited to painting operations, but may extend to various other types of operations as well.

Figure 2:
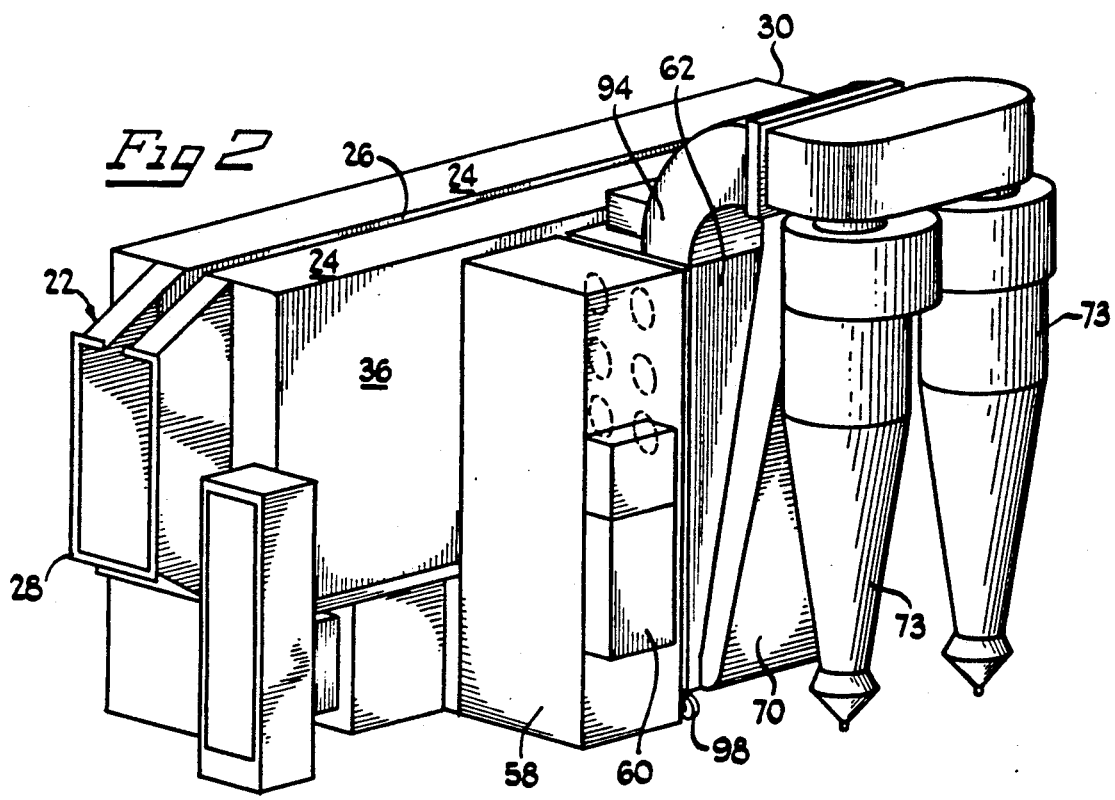
FIG. 2 is a perspective view of the embodiment shown in FIG. 1.

As seen in FIG. 1, a workpiece 12 is transported into a spray housing 14 along a conventional conveyor such as a wheel 16 and guide rail 18 assembly. The workpiece 12 depends from the conveyor by one or more electrically conductive wires or hangers 20 so that the workpiece 12 is maintained at ground potential as it travels through the spray housing. Referring to FIG. 2, a workpiece 12 enters the spray housing 14 through a spray housing inlet 22 having a smaller cross-sectional area than the spray housing 14, and which is tapered downward from the roof 24 of the spray housing 14 so as to prevent migration of sprayed particulate therethrough. This reduced inlet 22 in combination with an inward air flow through the inlet 22, as discussed below, has been found to be sufficient to prevent escape of particulate through the spray housing inlet 22. A transporting slot 26 is provided in the roof 24 of the spray housing 14 and the top of the spray housing inlet 22 which runs along the length of the spray housing 14 from the inlet end 28 to the outlet end 30 thereof to accommodate the depending wires 20 which carry the workpiece 12 through the spray housing 14.

As the workpiece 12 passes through the spray housing 14, it is sprayed with the desired particulate. In one embodiment of the invention, the particulate is paint powder which is sprayed on the workpiece 12 by a spray gun 32 which is capable of providing a generally uniform particulate or powder spray comprising a plurality of paint powder particles. The spray gun 32 operates in a conventional manner, well known in the art, to electrostatically apply the powder to the workpiece. That is, the spray gun 32 is charged to a predetermined negative potential and imparts that negative potential to the particulate sprayed therefrom. The negatively-charged particulate or powder spray is then electrostatically attracted to the workpiece 12 under the influence of the electrostatic field established by the polarity and potential difference between the electrostatic spray gun 32 and the workpiece 12. A plurality of spray guns 32 may be employed which may be operated manually or automated, wherein the guns 32 are commonly situated on opposing sides of the workpiece 12 as it passes through the spray housing 14.

In operation, not all sprayed particulate adheres to the workpiece 12. Sprayed particulate which does not adhere tot h part is referred to as "overspray". Overspray is comprised of particulate which misses the workpiece, particulate which rebounds from the workpiece surface, and particulate electrostatically deflected to other grounded surfaces such as spray booth metal components and the like. The majority of overspray powder is entrained in the spray housing exhaust air. Great savings are attainable by the ability to recover and reuse this entrained overspray particulate. It is important in such particulate recovery apparatus, however, that particulate used and recovered in one run not be intermixed with any differing particulate run in a subsequent run. Even slight intermixing of colors results in an undesirable speckling effect when the captured overspray is reused. It is desirable to provide such apparatus wherein color changes can be made rapidly while still maintaining separation of successively run colors. Apparatus constructed in accordance with the present invention provides significant improvement over prior designs in meeting these conflicting objectives.

An exhaust port 34 is provided in the rear wall 36 of the spray housing 14 through which the particulate entrained exhaust air from the spray housing passes. When running high volume or commonly used colors, a conventional cartridge cabinet 38, such as that shown in FIG. 3, is employed.

A conventional cartridge cabinet 38 comprises a cartridge housing 39, cartridge cabinet inlet 40, and a plurality of cartridge filters 42. The particulate entrained air from the spray housing 14 is drawn through the cabinet inlet 40 which preferably has a plurality of adjustable baffles 44 therein which are adjusted to distribute airflow as desired. This airflow design enhances transfer efficiency and yields consistent deposition uniformity, particularly if the exhaust port 34 is very tall. The particulate entrained air then passes through a series of cartridge filters 42, such as that shown in FIG. 6, which separate the particulate out of the airflow. With brief reference to FIG. 6, a cartridge filter 42 comprises a wire frame (not shown) formed into a right circular cylinder with a cloth or paper outer filter 46 wrapped about the perimeter thereof. The distal end 48 of the cartridge filter 42 is sealed with a plastic disk or the like; whereas, the proximal end 50 has an airflow opening 52 therein. Thus in operation, air is drawn from the interior of the cartridge filter 42 through the airflow opening 52 such that the particulate entrained air flows radially through the outer filter 46 into the interior of the cartridge filter. The outer filter 46 allows airflow therethrough with the particulate trapped by the filter 46 such that the particulate accumulates on the outer surface of the filter 46. Reverse pulses of air through the cartridge filter 42 are employed to cause the particulate accumulated on the filter to fall therefrom into the bottom of the conventional cartridge cabinet 38.

The particulate accumulated at the bottom of the conventional cartridge cabinet 38 can be removed manually or automatically, and subsequently recycled back to the spray gun 32. In the embodiment of FIG. 1, a feed line 54 extends into the bottom of the cartridge cabinet 38, through which particulate is pumped into a hopper 56 and subsequently pumped to the spray gun 32. Virgin powder can be loaded into either the hopper 56 or mixed with recycled powder directly in the bottom of the conventional cartridge cabinet 38. While only one feeder line 54, hopper 56 and spray gun 32 are shown, it is appreciated that several such components can be utilized simultaneously in large volume applications.

An exhaust fan housed in a fan cabinet 58 induces the desired airflow through the apparatus. Clean air is drawn in through the spray housing inlet 22 and drawn through the spray housing 14 wherein particulate is entrained in the airflow. The particulate entrained air is then drawn through the exhaust port 34 an into the cartridge cabinet 38 wherein air flows radially through the cartridge filters 42 with the particulate separated out and pulsed off the filters to the cabinet floor. The filtered air drawn through the cartridge filters 42 then passes through the fan cabinet inlet 59, into the fan cabinet 58, and through a final filter 60, to comply with occupational safety and health requirements, before being expelled back into the plant.

The aforementioned conventional cartridge cabinet operation is well known in the industry and provides for recovery of nearly all air entrained powder. Since it is very difficult and time-consuming to completely clean a cartridge cabinet 38, a plurality of separate, interchangeable conventional cartridge cabinets 38 are maintained when it is desired to run more than one color in the apparatus, wherein each cabinet is dedicated to one particular color. That is, after running a first color through a cartridge cabinet 38 dedicated to runs of only that particular color, that cartridge cabinet 38 is removed from the exhaust port 34 in the spray housing 14, the interior of the spray housing 14 and spray gun 38 cleaned, and a separate conventional cartridge cabinet dedicated to the color to be run next is inserted in the exhaust port 34. The cartridge cabinets are detachably coupled to the spray housing by means such as detachable belts 102, which will be described in connection with FIG. 4.

Alternatively, it is possible remove the outer filters 46 from the cartridge filters 42, storing the outer filters 46 in storage bags, washing down the interior of the cartridge cabinet 38, and placing outer filters 46 of the desired color in the cleaned cartridge cabinet, instead of maintaining separate cabinets for each separate color. A side door 61 can be provided for removal of the filters 42. However, this process is very lengthy and therefore undesirable for most commercial applications. Conversely, interchanging of dedicated cartridge cabinets 38 between successive runs provides rapid changeover. One problem associated with utilization of interchangeable conventional cartridge cabinets 38 is that such cabinets are expensive. Therefore, users are limited in the number of dedicated cabinets 38 which can be maintained. This makes it difficult to run low volume or specialized colors since it is cost-prohibitive to maintain cartridge cabinets dedicated to such colors and costly to go through the lengthy cleaning process to run such colors.

The present invention provides users heretofore unattainable flexibility in running differently colored particulate in successive runs. The present invention is utilized in conjunction with the aforementioned conventional cartridge filter recovery system.

Figure 3:
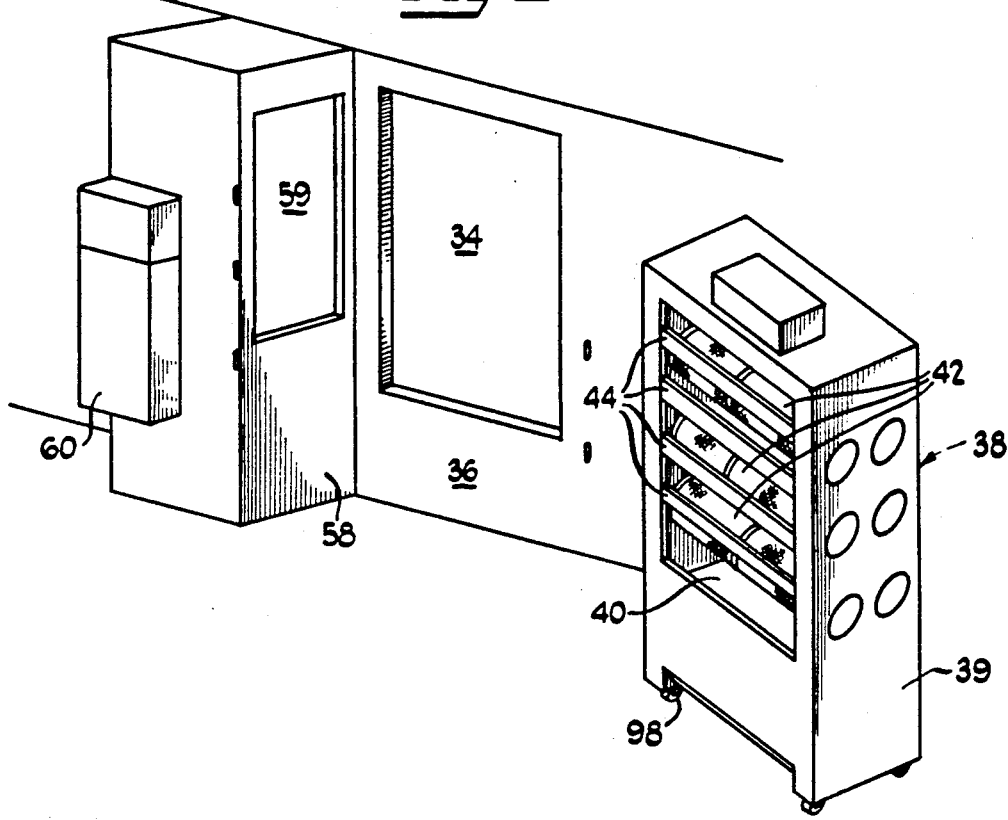
FIG. 3 is a partial, perspective view of the embodiment shown in FIG. 1, particularly illustrating the removability of the cartridge cabinet module.

To run low volume of custom colors, the conventional cartridge cabinet 38 is removed (see FIG. 3) and a scrap cartridge cabinet 62 (FIG. 1) is inserted in its place. With reference to FIG. 5, the mating wall 64 of the scrap cartridge cabinet 62 is provided with only a small cabinet intake opening 66 therein through which the particulate entrained airflow from the spray housing 14 can pass, with the remainder of the exhaust port 34 blocked off by the mating wall 64. Also, the connection is gasketed to minimize airflow leakage.

With continued reference to FIG. 5, the scrap cabinet mating wall 64 is provided with an angular recess at its lower end. The cabinet intake opening 66 is preferably located in an angled panel 68 which defines the upper surface of the recess. The lower surface of the recess is defined by a bypass duct 70 which is integral with, and elbowed around, the rear wall 71 of the cartridge cabinet 62 (see FIG. 1). As seen in FIG. 1, the inner surface 76 of the bypass duct 70 also comprises the bottom 78 and rear 80 surfaces of the scrap cartridge cabinet 62.

As best seen in FIGS. 1 and 5, a diverter door 72 is provided to alternately permit airflow into either the cabinet intake opening 66 or the bypass duct 70. That is, the diverter door 72 is pivotal between raised and lowered positions. In its lowered position as shown in FIG. 5, the bypass duct 70 is blocked and the particulate entrained airflow from the spray housing 14 passes through the cabinet intake opening 66 into the scrap cartridge cabinet 62. When the diverter door 72 is pivoted to its raised position as shown in FIG. 1, the cabinet intake opening 66 is blocked and the particulate entrained airflow from the spray housing 14 passes into the bypass duct 70 which directs the airflow to a cyclone separator 73, as discussed further below. The angled panel 68 and duct intake opening 74 are preferably at an angle of approximately 60° to facilitate the pivotal motion of the diverter door.

In one embodiment, the diverter door 72 is maintained in both its open and closed positions by angle brackets 81 (see FIG. 5). Angle brackets 81 are positioned on either side of the diverter door 72 and are removably inserted into collars 83 protruding from the angled panel 68 and bypass duct as seen in FIG. 5. To change the position of the diverter door 72 from the lowered position shown in FIG. 5 to its raised position, the angled brackets are removed, the diverter door 72 pivoted to its raised position, and the angle brackets 81 turned upside down so that the right angle portion thereof acts to secure the diverter door 72 in its raised position. The diverter door will be raised or lowered depending upon the particulars of the run, as delineated below.

For runs in which powder recovery is not contemplated, such as very short runs, the diverter door is pivoted to its lowered position. When the diverter door 72 is in its lowered position, the particulate entrained airflow enters the scrap cartridge cabinet 62 at its lower end and is drawn the full height of the scrap cartridge collector 62 wherein cartridge filters 42 separate the particulate, as in the previously described conventional cartridge cabinet 38. This separated particulate will be speckled with other colors from other runs and is therefore not reusable. However, this use of the scrap cartridge cabinet 72 is a simple and efficient means for running varying short runs in which powder recovery is not important. Air is drawn into the scrap cabinet 62 under the influence of an exhaust fan 82, and exhausted therefrom through a final filter 84 under the influence of the exhaust fan 82 after passing through the plurality of cartridge filters 42.

In shorter and custom color runs wherein power recovery is desirable, it is preferable to run the apparatus in bypass mode utilizing one or more cyclone separators 73. Cyclone separators 73 recover between approximately 80% and 90% of particulate from the airflow which can then be reused. In such applications, a cyclone separator 73 is attached to the spray booth apparatus 10 as shown in FIGS. 1 and 2, and the apparatus is run in bypass mode wherein the diverter door 72 is pivoted to its raised position so that the particulate entrained airflow from the spray housing 14 passes into the bypass duct 70 and subsequently into the inlet duct 86 of the cyclone separator 73. In the embodiment shown in the drawings, a dual cyclone separator 73 is employed wherein the cyclone inlet duct 86 splits the particulate entrained airflow and directs the two portions into the respective, adjacent cyclones.

The inlet duct 86 of the cyclone separator 73 is scrolled so as to impart a predetermined centrifugal force to the particulate entrained air passing therethrough. The centrifugal force propels the particulate against the side walls 88 of the cyclone separator 73 which separates the majority of particulate from the airflow. This separated particulate falls to the bottom of the cyclone and accumulates thereat until removed for reusage, which can be by either manual or automated means. The remaining fine particulate, not separated out by the centrifugal force of the cyclone, is drawn upwardly through a central, baffled cyclone exhaust opening 90. In conventional cyclone separator operation, the fine particulate exhausted through the cyclone exhaust opening 90 is collected by a bag house or another cartridge filter cabinet. In accordance with the present invention, the fine particulate from the cyclone separator is discharged into the scrap cartridge cabinet 62 through a cyclone exhaust duct 92 in communication with a scrap cabinet bypass inlet duct 94. The opening of the cyclone exhaust duct 92 and bypass inlet duct 94 are the same size so that an airtight seal can be effected between the two ducts when adjacent one another. Similarly, the bypass duct outlet 82 is proportioned to be the same size as the split cyclone inlet duct 86 such that the mating outer edges of the mating ducts form an airtight seal. The scrap cartridge cabinet 62 serves to filter out the fine particulate before the airflow is discharged through the final filter 84 into the plant. The filtered fine particulate accumulated in the scrap collector will be speckled and therefore, not reusable. However, the large majority of air entrained particulate which is separated in the cyclone separators 73 is untainted and capable of reuse. Powder accumulated at the bottom of the cyclones 73 is transported manually or mechanically into a hopper or feeder 56 whereafter the powder is mixed with virgin powder and pumped back to the spray gun 32 for reuse. Thus, the air discharged from the exhaust fan 82 and exhaust filters is essentially free of paint spray except for a minute percentage of paint spray.

A particular advantage of apparatus constructed in accordance with the present invention is that the single scrap cartridge cabinet 62 serves a dual function as both primary separator when airflow is directed into the cabinet 62, and secondary separator to collect the fine particulate from the cyclone 73, thus allowing significantly improved flexibility for short and custom runs. As discussed above, when running short runs or custom colors in which particulate recovery is desired, the cyclone 73 is employed with the diverter door 72 pivoted to its raised position. This results in the bypass duct 70, cyclone separator 73, cyclone inlet duct 86, and cyclone exhaust duct 92 being coated with particulate of the color being run.

In order to make a short run wherein recycling is not required, it was previously necessary to clean the entire cyclone 73 and its associated ductwork between successive runs. The present invention allows such a short non-recycling run to be performed without the need to clean the cyclone or its associated ductwork by merely pivoting the diverter door 72 to its lowered position. This blocks airflow to the bypass duct 70 and cyclone 73 so that the particulate therein is not contaminated with the differently colored particulate being run directly through the scrap cartridge cabinet 62. Upon completion of the short non-recycling run, return to running the color in the cyclone 73 is easily resumed by merely pivoting the diverter door 72 back to its raised position. Accordingly, no ductwork is required to be cleaned as was previously necessary; only the spray housing 14 need be cleaned.

An alternative embodiment of a particulate recovery system, in accordance with the present invention, is shown in FIG. 8. In this embodiment, the inlets to the cartridge cabinet 58 and bypass duct 70 are along side one another. As seen in FIG. 8, the single pivotal diverter door 72 is replaced with two separate doors 75 which cover the cartridge cabinet 58 and bypass duct inlets. These doors may be hinged or slidable to alternatively allow and block-off airflow to the cartridge cabinet 58 and bypass duct 70. In the alternative, a single slidable door can be employed wherein the door blocks airflow into the bypass duct 70 while allowing airflow into the cartridge cabinet 58 in its first position, and, alternatively, blocks airflow into the cartridge cabinet 58 and allows airflow into the bypass duct 70 in its second position. Ductwork extends from the top of the cartridge cabinet 58 and bypass duct cabinet 70 extending to the cyclone 73. Thus, the apparatus 10 operates in the same manner as the previously described embodiment, the only difference being the realignment of various components.

The embodiment of FIG. 8 allows for a substantially larger bypass duct inlet area which, accordingly, allows for greater particulate entrained airflow therethrough. This allows for increased production speeds as compared to the embodiment shown in FIGS. 1-7.

To assure that the colors being run directly through the scrap cartridge cabinet 62 do not contaminate the color in the cyclone 73 and its associated ductwork, a safety damper 96 is provided to isolate the cyclone 73. As seen in FIG. 1, the safety damper comprises a slidable panel which can be raised or lowered to respectively block off and open up the cyclone inlet 86 and exhaust 92 ducts. The safety damper 96 can be raised and lowered either manually or by an actuator. Thus, when the cyclone is to be utilized, the diverter door 72 is raised and the safety damper 96 lowered. When the cyclone is not used, the safety damper is raised to isolate the cyclone 73 and the diverter door 72 is lowered. In the embodiment of FIG. 8, separate safety dampers 96a and 96b may be employed to block the ductwork from the cartridge and bypass duct cabinets, respectively. With the cyclone isolated in this manner, it can be easily removed from the remainder of the apparatus 10 and cleaned while the non-recycling color is run directly through the scrap cartridge cabinet 62, and the cyclone can likewise be reattached while the apparatus is in operation. Thus, one operator can clean the powder guns 32 and load the second color while another operator quickly flushes out the overspray inside the spray housing 14. This provides significant savings in changeover time over prior designs.

The scrap cartridge cabinet 62 can be interchanged with a conventional dedicated cartridge cabinet 38 depending upon the specifics of the desired run or runs. For high volume runs wherein the nearly completed powder recovery attainable with conventional cartridge cabinets is important, the scrap cartridge collector 62 is replaced with a conventional cartridge cabinet 38. As discussed above, this is the preferred recovery means due to its efficiency; but requires dedicated cartridge cabinets 38 for each color to be run. For runs of less frequently run colors, wherein it is uneconomical to maintain a cartridge cabinet dedicated to that particular color, cyclone separators 73 are the preferred means of particulate recovery. For such applications, the conventional cartridge cabinet 38 is removed and replaced with a scrap cartridge cabinet 62, having a cyclone separator 73 attached thereto. This arrangement allows airflow either through the cyclone 73 for applications in which the partial powder recovery of the cyclone is desirable, or directly into the scrap cartridge cabinet 62, as discussed above. This interchangeability of components provides a spray booth apparatus 10 which can be configured as desired to satisfy a wide diversity of powder recovery needs.

Figure 4:
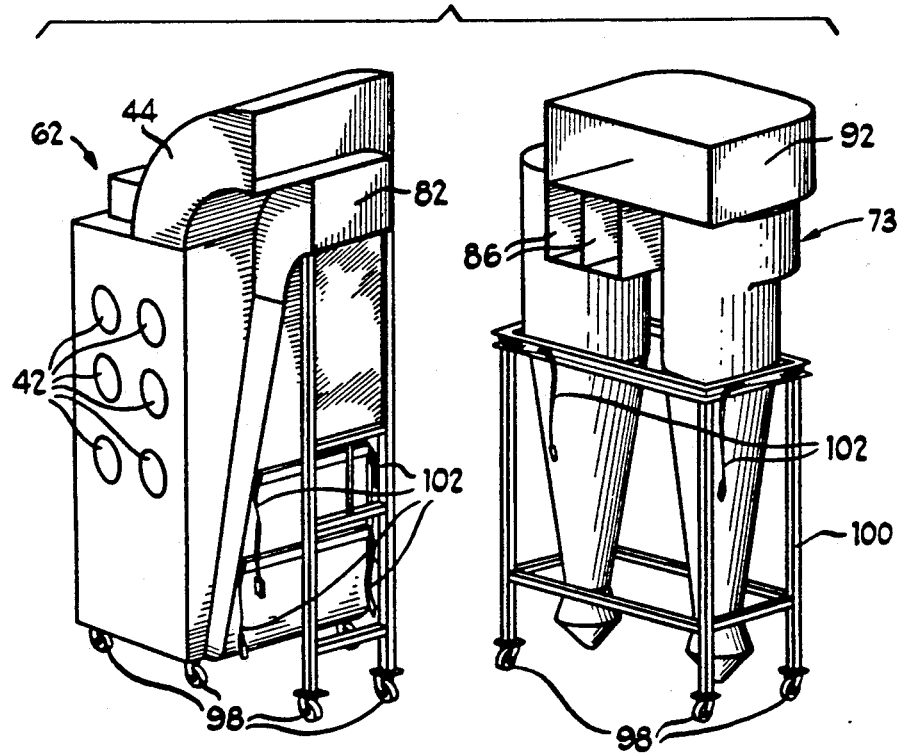
FIG. 4 is a perspective view of both a cartridge cabinet module and cyclone module employed in the spray booth apparatus shown in FIG. 1.

To facilitate the aforementioned interchanging of the various components, the conventional cartridge cabinets 38, scrap cartridge cabinets 62, and cyclones 73 are all mounted on casters 98 upon which the components can be easily wheeled about. As best seen in FIG. 4, the cyclones 73 are supported on caster mounted steel frame supports 100 upon which they can be easily wheeled into the desired position. The scrap cartridge cabinet 62 is generally supported by casters 98 inserted directly in the bottom thereof, with caster-mounted steel frame supports 100 to support he bypass duct outlet 82 and bypass inlet duct 94 (see FIG. 4). The conventional cartridge cabinets 38 are supported completely by casters 98 inserted in the bottom thereof.

To facilitate the securing of the interchangeable components in their desired positions during operation of the apparatus 10, with particular interest in preventing escape of air between adjacent components, strap latches 102 are employed. With reference to FIG. 4, strap latches 102 are secured to one end of the scrap cartridge cabinet 38 and the steel support frames 100. The strap latches 102 associated with the scrap cartridge cabinet 38 and its associated steel support frame 100 are attached to the spray housing 14. The strap latches associated with the cyclone steel support frame 100 are, in turn, attached to the scrap cartridge cabinet 62. Turning of a crank in the strap latches 102 tightens and loosens the straps as desired. Employment of strap latches 102 in conjunction with gasketed mating openings has been found to be an effective and efficient means for securing the components of the apparatus 10 while preventing air leakage between adjacent components.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spray booth apparatus for spraying workpieces with particulate, comprising:
    spray housing;
    a primary particulate filter system for a predetermined high volume usage;
    a secondary particulate filter system for lower volume and special colors;
    first air passageway means for directing airflow from said spray housing through said primary particulate filter system;
    second air passageway means for directing airflow from said spray housing through said secondary particulate filter system;
    third air passageway means for directing airflow from said secondary particulate filter system to said primary particulate filter system to collect fine particulate not collected in said secondary particulate filter system; and
    means to direct air into either of said first and second air passageway means, said means to direct air being in a first position to cause airflow from said spray housing to pass through said primary particulate filter system for high volume runs and said means to direct air being in a second position to cause airflow from said spray housing to pass through said secondary particulate filter system for processing lower volume and special colors.

2. Apparatus in accordance with claim 1 in which said primary particulate recovery means is a cartridge type particulate recovery means.

3. Apparatus in accordance with claim 1 in which said secondary particulate recovery means is a cyclone type particulate recovery means.

4. Apparatus in accordance with claim 2 in which said cartridge type particulate recovery means is immediately adjacent said spray housing means.

5. Apparatus in accordance with claim 1 in which said means to direct air comprises a pivotal panel.

6. Apparatus in accordance with claim 1 in which said means to direct air comprises separate doors movable between open and closed positions for the respective first and second air passageway means.

7. Apparatus in accordance with claim 5 in which said pivoted panel also serves to define at least a portion of the airflow path from said exhaust port to both the primary particulate recovery means and secondary particulate recovery means when in its first and second positions, respectively.

8. Apparatus in accordance with claim 3 in which the particulate separated by said particulate recovery means is reused as particulate spray in said spray booth housing.

9. Apparatus in accordance with claim 1 in which damper means is provided, variable between an open position in which said secondary particulate recovery means is in communication with both said second and third air passageway means, and a closed position in which said second and third air passageway means are blocked so that said secondary particulate recovery means is isolated form the remainder of said spray booth apparatus and can therefore be removed, cleaned and reattached while the primary particulate filter system is in use.

10. Spray booth apparatus for spraying workpieces with particulate having both cartridge and cyclone type particulate recovery systems, comprising:
    spray housing means for containing particulate sprayed;
    airflow diverter means for directing said particulate entrained airflow from said spray housing to either said cartridge type particulate recovery system or said cyclone type particulate recovery system; and
    damper means for isolating said cyclone type particulate recovery system from said spray booth apparatus, whereby said cyclone can be completely separated, cleaned and reattached to the remainder of said spray booth apparatus while said apparatus is in operation.

11. Apparatus in accordance with claim 10 in which said cyclone type particulate recovery system is mounted on rollers for easy removability.

12. Apparatus in accordance with claim 10 in which said cyclone type particulate recovery system is attached to said spray booth apparatus by adjustable straps thereabout.

13. Apparatus in accordance with claim 10 in which both of said cyclone and cartridge type particulate recovery systems are modular, interchangeable units.

14. A method for recirculating overspray particulate in an electrostatic spraying operation, comprising:
    spraying the workpiece with particulate;
    inducing particulate entrained airflow from the spray housing to a primary particulate filter system for high volume runs;
    separating out at least a portion of the air entrained particulate through the primary particulate filter system;

blocking particulate entrained airflow from flowing directly from the spray housing to the primary filter system and causing the airflow to flow to a secondary particulate filter system for processing lower volume and special color runs;

separating out at least a portion of the air entrained particulate through the secondary particulate filter system;

after passing through the secondary filter system causing the particulate entrained airflow from the secondary particulate filter system to flow into the primary particulate filter system; and separating out a substantial remainder of the air entrained particulate from the air in the primary particulate filter system.

15. A method in accordance with claim 14 in which the blocking of the airflow from flowing directly from the primary filter system comprises shifting a selectively positioned means to block the airflow through a primary airflow passage while shifting the selectively positioned means opens a previously closed secondary airflow passage.

16. A method in accordance with claim 14 in which air flows through a third passageway between the secondary filter system and the primary filter system and in which a means is moved to a closed position during said high volume runs to prevent airflow between the primary particulate filter system and the secondary particulate filter system, and moved to an open position during said lower volume and special color runs to allow airflow between the secondary particulate filter system and the primary particulate filter system.

17. A method in accordance with claim 14 including the step of cleaning the air in the primary filter system by flowing the air through a cartridge type particulate recover system.

18. A method in accordance with claim 14 including the step of cleaning the air in the secondary particulate filter system by flowing the air in a cyclone type particulate filter recovery system.

19. A method in accordance with claim 14 including the step of reusing the particulate filtered from the air in the primary filter system.

20. A method for recovering overspray particulate from a spray housing, comprising:

connecting a dedicated primary filter system, dedicated to runs of a specific high volume color, in communication with said spray housing flowing said overspray particulate and air from said spray housing into said primary filter system, which primary filter system separates out at least a portion of the overspray particulate;

connecting different dedicated primary filter systems to the spray housing, each dedicated to runs of a different specific high volume color, to correspond to the particular color of particulate to be sprayed;

blocking the airflow from the spray housing to the primary filter system for runs of lower volume and special colors;

flowing air from the spray housing to a secondary, non-dedicated filter system to the spray housing when running of lower volume and special colors to separate out a portion of the particulate;

changing said dedicated primary filter system to a primary filter system dedicated to scrap collection; and drawing the remaining overspray particulate not separated out by said secondary filter system into said primary filter system dedicated to scrap collection removing more particulate from the air in the primary filter system.

21. A method in accordance with claim 20 including the step of cleaning the air in the primary particulate filter system for flowing air through a cartridge type particulate recovery system.

22. A method in accordance with claim 20 including the step of cleaning the air in the secondary particulate filter system by flowing the air through a cyclone type particulate filter recovery system.

23. A method in accordance with claim 20 including moving a door means to a first position to allow particulate entrained airflow from the spray housing to the primary filter system while blocking airflow from the spray housing to the secondary filter system, and moving the door means to a second position to allow particulate entrained airflow from the spray housing to the secondary particulate filter system while blocking airflow from the spray housing to the primary filter system.

24. A method in accordance with claim 20 including the step of reusing the particulate filtered from the air in the primary filter system.

25. A method in accordance with claim 20 including the step of reusing the particulate filtered from the air in the secondary filter system.

* * * * *

UNITED STATES PATENT AND TRADEMARK OFFICE
CERTIFICATE OF CORRECTION

PATENT NO. : 5,107,756
DATED : April 28, 1992
INVENTOR(S) : William Diaz

It is certified that error appears in the above-identified patent and that said Letters Patent is hereby corrected as shown below:

Column 1, Line 22, change "Electrostatically" to --Electrically--.

Column 3, Line 31, after "mode" insert --.-- (period).

Column 4, Line 24, change "reference" to --referenced--.

Column 5, Line 38, change "tot h part" to --to the part--.

IN THE CLAIMS:

Column 12, Line 14, change "pivoted" to --pivotal--.

Column 12, Line 30, change "form" to --from--.

Column 13, Line 36, change "recover" to --recovery--.

Signed and Sealed this

Third Day of August, 1993

Attest:

MICHAEL K. KIRK

Attesting Officer

Acting Commissioner of Patents and Trademarks